(12) United States Patent
Arnold et al.

(10) Patent No.: US 6,942,037 B1
(45) Date of Patent: Sep. 13, 2005

(54) PROCESS FOR MITIGATION OF WELLBORE CONTAMINANTS

(75) Inventors: Terry Arnold, Bakersfield, CA (US); William Robert Graham, Fellows, CA (US); James Dennis Cranmer, Taft, CA (US)

(73) Assignee: Clariant Finance (BVI) Limited, Tortola (VG)

( * ) Notice: Subject to any disclaimer, the term of this patent is extended or adjusted under 35 U.S.C. 154(b) by 356 days.

(21) Appl. No.: 10/219,636

(22) Filed: Aug. 15, 2002

(51) Int. Cl.$^7$ ............................................. E21B 37/06
(52) U.S. Cl. ....................... 166/312; 166/300; 166/310
(58) Field of Search ................................ 166/279, 300, 166/305.1, 309–312

(56) References Cited

U.S. PATENT DOCUMENTS

| | | | |
|---|---|---|---|
| 3,599,715 A | * 8/1971 | Roszelle | 166/270.1 |
| 4,488,598 A | * 12/1984 | Duerksen | 166/252.4 |
| 4,830,827 A | 5/1989 | Au et al. | 422/7 |
| 4,978,512 A | 12/1990 | Dillon | 423/226 |
| 5,128,049 A | 7/1992 | Gatlin | 210/752 |
| 5,462,721 A | 10/1995 | Pounds et al. | 423/226 |
| 5,674,377 A | 10/1997 | Sullivan, III et al. | 208/208 R |
| 6,143,709 A | * 11/2000 | Carey | 166/309 |

\* cited by examiner

*Primary Examiner*—Zakiya Walker
(74) *Attorney, Agent, or Firm*—Richard P. Silverman

(57) ABSTRACT

A method is disclosed for intermittently mitigating hazardous sulfur compounds, such as hydrogen sulfide, mercaptans and sulfur oxides, from a fluid in the head space of a wellbore. The method comprises contacting the fluid with a foamed aqueous stream comprising an active scavenging agent, such as a triazine, and a stiff foaming agent. The scavenging agent reacts with hazardous sulfur compounds to eliminate the compounds from the fluid stream in the vapor space of the wellbore without withdrawing the hydrocarbon from the wellbore and without releasing hazardous sulfur compounds to the environment.

18 Claims, No Drawings

PROCESS FOR MITIGATION OF WELLBORE CONTAMINANTS

FIELD OF THE INVENTION

This invention relates to a method for abating hazardous sulfur emissions in wellbore servicing. In particular, this invention relates to a safe method for intermittently mitigating hazardous sulfur compounds such as hydrogen sulfide and organic sulfides in such streams, particularly natural gas streams at the wellbore.

BACKGROUND OF THE INVENTION

Natural gas is a mixture of hydrocarbons and non-hydrocarbon gases found in geologic formations beneath the earth's surface, often in association with petroleum. As obtained from the ground, raw gas contains a number of impurities which must be removed at some point. The principal impurities in natural gas are water, carbon dioxide, hydrogen sulfide, organic sulfides and condensable hydrocarbons, such as propane, butane and pentane. When idle, and particularly when the hydrocarbons are accompanied by high sulfur concentrations, hazardous sulfur compounds will accumulate at the wellbore, often at pressures significantly above atmospheric pressure. When this buildup of hazardous sulfur compounds occurs, the hazardous compounds can be released into the environment, particularly when maintenance of the well for workover or abandonment purposes is required. Furthermore, it is during such maintenance that there exists the greatest risk of injury and death to maintenance workers and the greatest risk of hazardous emissions to the environment.

Sulfur compounds, for example, hydrogen sulfide, mercaptans and sulfur oxides, such as sulfur dioxide and sulfur trioxide, can be produced by natural forces and as by-products of industrial processes. These compounds, when occurring at certain concentration levels, and, particularly, when released in the gas phase to the atmosphere, are deemed to be at least offensive and, at times, a hazard to the environment. In fact, such compounds are sometimes referred to in the art as "hazardous sulfur compounds" and they are referred to as such herein.

Generally speaking, hydrogen sulfide and organic sulfides (collectively here "sulfides"), because of their corrosiveness and toxicity, are typically removed from natural gas in the field prior to introduction to a pipeline for transport to a market or off-site processing plant. The maximum level of hydrogen sulfide, "$H_2S$", the primary sulfide impurity of natural gas, permitted to be introduced into a pipeline is often limited to 0.25 grains per 100 cubic feet of gas, that is, 4 parts per million (ppm), although in some instances, up to 1 grain per 100 cubic feet (16 ppm) is acceptable.

At a concentration of 700 ppm, as little as one breath of hydrogen sulfide can kill. Although hydrogen sulfide can be detected by a "rotten egg" odor in concentrations from 0.03 ppm to 150 ppm, larger concentrations paralyze a person's olfactory nerves so that odor is no longer an indicator of the hazard. With humans, small concentrations can cause coughing, nausea, severe headaches, irritation of the mucous membranes, vertigo, and loss of consciousness. Hydrogen sulfide forms explosive mixtures with air at temperatures of 260° C. or above, and is dangerously reactive with powerful oxidizing materials.

For producing wells, that is wells from which fluids are withdrawn, various methods and processes are, and have been, employed to treat hazardous sulfur compounds to prevent their release to the environment. According to some processes, such treatments are conducted at a time when the sulfur compounds are dissolved or dispersed in or otherwise intimately associated with fluid hydrocarbons after or during the removal of the fluid hydrocarbons from the well and before the fluid hydrocarbon streams are subjected to refinery operations, used as a fuel, or used as a precursor for subsequent operations. Such operations are referred to herein as "upstream" treatments. Other treatments, referred to herein as "down stream" treatments, are conducted after the fluid hydrocarbons have been refined, or used as a fuel, or employed as a precursor for the manufacture of hydrocarbon-based products.

$H_2S$, like hydrocarbon components of natural gas, exists in the gaseous state at normal temperatures and pressures. When working on a wellbore which is known to have accumulated hazardous sulfur compounds, typically water, known as "kill water" is injected into the wellbore. Other methods include the injection of a sweetening agent such as triazine with the kill water. There are a variety of approaches for removing $H_2S$ from, or at least substantially reducing the amount of $H_2S$ in natural gas, i.e., "sweetening" natural gas. One general approach is to expose the raw natural gas to a treatment liquid containing an agent which chemically reacts with $H_2S$, a so-called $H_2S$ scavenger. Usually, the natural gas is bubbled through the treatment liquid and as the bubbles rise through the treatment liquid, $H_2S$ comes into contact with the agent in the liquid to react and form a non-gaseous, or relatively non-volatile, product. The $H_2S$ thus becomes trapped in the liquid phase, and is thereby removed from the gas. In other schemes, a portion of a sulfur rich gas may be employed to aspirate a treatment fluid and pass the admixed stream through a mixing zone, or an atomizing nozzle before the admixture of gas and treatment fluid is contacted with the fluid in a wellbore, in a pipeline, or in a vessel. Such systems are characterized by operations which employ pumps and compressors to maintain the pressure at the wellbore during the treatment process. These treatment methods often result in incomplete scavenging of the hydrogen sulfide, with residual hydrogen sulfide concentrations of 40 to 100 ppm being typical of the gas escaping from the wellbore.

One type of agent often used to react with $H_2S$ is the reaction product of an organic amine compound having an "active hydrogen" and an aldehyde. An active hydrogen herein is a hydrogen directly bonded to a nitrogen atom. It is this type of scavenging or trapping agent to which the present invention relates. Examples of such agents are described in U.S. Pat. No. 4,978,512 (issued Dec. 18, 1990 to Dillon) and U.S. Pat. No. 5,462,721 (issued Oct. 31, 1995 to Pounds et al.). The specifications of both of these earlier patents are incorporated herein by reference.

As described by Pounds et al., there are a number of characteristics that are considered desirable in treatments containing such active agents. Generally speaking, it is desirable that the agent be highly reactive, i.e., the $H_2S$ (or organic sulfides) should react readily with the agent as the $H_2S$ passes through the treatment liquid. At the same time, it is desirable that the agent remain effective even in the presence of a large excess of $CO_2$, that is, it should be selective. The scavenging agent should be easy to handle, that is, be of appropriate viscosity, have a suitable pour point and low toxicity. In terms of performance in the processes of the prior art, it is also desirable that the agent remain in the liquid state and not foam excessively in use to prevent contamination of the treated gas.

It was also desirable in the processes of the prior art for the reaction product(s) of the H$_2$S and the scavenging agent to have certain characteristics. It has generally been the approach to use single phase treatments. In particular, liquid treatments in which the products of the H$_2$S trapping reaction are soluble in the liquid have thus been considered highly desirable because of the ease of disposal of the spent fluids.

Processes are sought for mitigating wellbore emissions of hazardous sulfur compounds from closed in wells in situ where there is no flow of gas or oil from the well for a period of time during which the safe maintenance in the area above the wellbore can be conducted.

Processes are sought for intermittently mitigating high (200+ppm hydrogen sulfide) hazardous sulfur emissions at a wellbore in situ to sulfur emission levels less than about 10 ppm of hydrogen sulfide, and preferably for mitigating high sulfur levels less than about 4 ppm of hydrogen sulfide, so that maintenance personnel can work safely in the proximity of such wellbores without exposing the maintenance personnel to dangerous working conditions for discrete periods of time without requiring extensive personal safety equipment.

SUMMARY OF THE INVENTION

The present invention relates to a method for intermittently mitigating hazardous sulfur compounds, such as hydrogen sulfide, mercaptans and sulfur oxides, from a fluid in the head space of a wellbore in situ comprising contacting the fluid within the wellbore with a foamed aqueous stream comprising an active scavenging agent, such as a triazine and a stiff foaming surfactant. The scavenging agent reacts with hazardous sulfur compounds to eliminate the compounds from the fluid stream in the vapor space of the wellbore. By this invention, hazardous sulfur compounds are converted to non-volatile, sulfur-containing species which are not soluble in hydrocarbons. The present invention employs the active agent in a highly foamed aqueous stream, or multi-phase stream, to directly contact the vapor in the head space of the wellbore.

Surprisingly, it was discovered that by injecting a stiff foamed aqueous stream comprising an active scavenging active agent disposed in a stiff foaming surfactant, the concentration of hazardous sulfur compounds such as hydrogen sulfide at the wellbore was mitigated to safe levels after relatively short periods of treatment time. The addition of the stiff foaming surfactant combined with the active scavenging agent resulted in unexpected improvement over separately using large concentrations of the active scavenging agent without the stiff foaming surfactant. Even more surprising was a simultaneous and precipitous reduction in pressure at the wellbore, typically reducing the pressure at the wellbore to almost atmospheric pressure, and at times creating a vacuum, which significantly lessened the potential hazard to personnel in the immediate vicinity of the wellbore. Thus, the process of the present invention provides a simple and effective treatment which mitigates hazardous sulfur emissions in situ at a wellbore. As a result of the treatment, the emissions of hazardous sulfur compounds from the head space of the wellbore is almost immediately brought to safe levels of less than 10 ppm hydrogen sulfide and the pressure at the wellbore is simultaneously relieved without any release of the hazardous sulfur compounds to the surrounding environment.

In one embodiment, the present invention comprises a process for intermittently mitigating hazardous sulfur compounds in a wellbore, wherein the wellbore defines a vapor space between a surface end and a hydrocarbon fluid within the wellbore. The process comprises injecting a kill water stream into the wellbore at an effective kill water rate, and injecting an effective amount of a foamed aqueous stream comprising an active scavenging agent and a stiff foaming surfactant into the vapor space for an effective period of time to reduce pressure at the wellbore and to significantly reduce hazardous sulfur compounds in the vapor space without withdrawing hydrocarbon fluid or hazardous sulfur compounds.

The process of the present invention provides a safe and effective way to intermittently mitigate potentially hazardous wellbore emissions from shut-in natural gas and crude oil wells, and potentially any other similar situations wherein hazardous sulfur compounds, such as hydrogen sulfide pockets can accumulate under pressure in confined spaces, for example in handling animal waste or municipal waste. The mitigation of the hazardous sulfur compounds will continue during the treatment process of the current invention. Upon termination of the treatment, the wellbore will return to its equilibrium state.

The incorporation of the composition with the sour crude oil or sour natural gas does not have any deleterious effect on the oil or gas, and the composition appears to selectively react with the sulfur compounds.

DETAILED DESCRIPTION OF THE INVENTION

Certain hazardous sulfur compounds, particularly hydrogen sulfide and mercaptan compounds, are known to occur with fluid hydrocarbons in earthen formations, such as coal beds and subterranean formations which contain oil and/or gas. It is well known that hazardous sulfur compounds can be dissolved or dispersed in fluid hydrocarbons recovered from such formations and/or separately produced with such hydrocarbons in the gas phase. Regardless of the form of occurrence, and particularly in the case of high concentrations thereof, it has long been important that hazardous sulfur compounds be handled and treated using methods designed to prevent their release, for example, as a gas, to the environment. For purposes of this disclosure, "fluid hydrocarbons" are defined to mean hydrocarbons which occur in the liquid phase, such as crude oil, and hydrocarbons which occur in the gas phase, such as natural gas. Still further, a fluid hydrocarbon containing hydrogen sulfide and/or mercaptans is referred to herein as being "sour." For example, crude oil and natural gas which are recovered from earthen formations and coal beds together with hydrogen sulfide and/or mercaptans have been referred to in the art as "sour" crude and "sour" gas and are referred to as such herein. As used herein, the term "foamed aqueous stream" means that at least a portion of the foamed aqueous stream comprises foam or will generate foam when contacted with a gas stream.

At a wellbore in a natural gas or oil well, the concentration of hazardous sulfur compounds can build up to concentrations which are dangerously high, When dangerously high concentrations of sulfur compounds are present in a wellbore, they must be safely relieved in order to permit necessary maintenance such as welling pulling and other procedures to be performed on the well. The act of bringing under control so that surface connections may be removed for well servicing or workover is usually accomplished by circulating water or mud to load the hole and render it incapable of flowing. The water stream employed in this manner is referred to as kill water. These high levels of sulfur compounds, particularly hydrogen sulfide, create very dangerous conditions for workers on oil wells and rigs, and sometimes create hazards where necessary work can not be carried out. Attempts at treating this problem with conventional methods, such as introducing a hydrogen sulfide scavenger into the wellbore alone, or with a kill water stream were not effective.

The scavenging agents useful in the process of the present invention include a triazine such as the reaction product of monoethanolamine and formaldehyde, i.e., 1,3,5 tri-(2-hydroxyethyl)-hexahydro-S-triazine. Other scavenging agents which are suitable for use in the present invention include alkanolamines, formaldehyde, glutaraldehyde, glyoxal, and mixtures thereof.

Experiments were conducted on oil wellbores having hydrogen sulfide concentrations of 4000 ppm-wt or higher. As a base line, tests were conducted by introducing a dilute solution of a hydrogen sulfide scavenger, SCAVTREAT™ 8112 (available from Clariant Corporation, Charlotte, N.C.), a 40 wt-% triazine solution, into the wellbore as a fine spray at low pressure. This resulted in some reduction in the hydrogen sulfide concentration, but the concentration at the wellbore was still unacceptably high. The addition of kill water, or water having about 200 ppm-wt hydrogen sulfide, introduced at high pressure along with the dilute triazine solution, provided some additional reduction in the hydrogen sulfide concentration at the wellbore, but the concentration of hydrogen sulfide at the wellbore was still above a safe hydrogen sulfide concentration which would permit work on the wellbore to be completed safely. According to the present invention, a stiff foaming surfactant, SURFTREAT 8534™ (available for Clariant Corporation, Charlotte, N.C.), a linear alkyl sulfonate foaming surfactant, was added to the triazine solution with and without kill water with the surprising result that that the hydrogen sulfide concentration at the wellbore dropped below detectable levels in wellbores having initial hydrogen sulfide concentrations of from about 4000 to about 10,000 ppm-wt hydrogen sulfide. Even more surprising, the pressure at the wellbore following the treatment of the present invention dropped to vacuum conditions, or pressures at or below atmospheric pressure. With the present invention, it was discovered that the combination of the dilute triazine solution and the stiff foaming surfactant resulted in more effective mitigation of the wellbore sulfur content than the use of the hydrogen sulfide scavenger alone, or with kill water, introduced at low pressure or at high pressure. Preferably, the volume of the treatment solution comprising the scavenger and the stiff foaming surfactant ranges from about 0.01 to about 10 volume percent. More preferably, the volume of the treatment solution comprising the scavenger and the stiff foaming surfactant ranges from about 0.01 to about 3 volume percent. Most preferably, the volume of the treatment solution comprising the scavenger and the stiff foaming surfactant ranges from about 0.1 to about 3 volume percent. Furthermore there a distinct cost advantage in favor of the present invention in that the combination treatment of the present invention provides mitigation of the wellbore at considerably less cost than the use of the scavenger, which in solutions having up to 10 percent scavenger were unable to reduce the hydrogen sulfide concentration at the wellbore to a safe level.

Foam Composition

The foam composition of the present invention is nominally comprised of a dispersed gas phase wherein the gas contains a scavenging agent and a continuous liquid phase nominally comprised of a foaming agent, water in a major portion, and the scavenging agent. The water may be chemically pure, fresh, or contain appreciable salinity and/or hardness, and may contain dissolved gases. At the discretion of one skilled in the art, the liquid phase may contain other additives which function to produce a better performing foam at the conditions of use. Foam stabilizers are one such example. The foam may additionally contain solids such as sand and dirt and/or a separate organic phase.

The volume percentage of the combined gaseous and liquid phase which is gas is defined to be the foam quality. The quality of the foam is preferably about 50 to about 99.75% and more preferably about 75 to about 99.5 volume percent at wellbore conditions. The properties of the foam may be altered by the use of various additives known to those skilled in the art. As an example, a stiffer foam may be prepared by adding guar gum or other organic polymers and solids such as bentonite to the base components.

According to the process of the current invention, it is not necessary to provide a separate gaseous phase to combine or aerate the foam composition in order to initiate or form the foam phase. Applicant's have discovered that by combining the stiff foaming surfactant with the scavenging agent in an aqueous solution and then injecting the solution into the wellbore alone, or combined with a kill water stream, that the foam composition is formed in the wellbore in sufficient quantities to contact the gaseous phase within the vapor space of the wellbore and therein mitigate the hazardous sulfur compounds. Preferably, the rate at which the foamed aqueous stream is injected into the wellbore varies from about 0.25 gal/min (0.57 m$^3$/hr) and about 10 gal/min (2.27 m$^3$/hr). Kill water rates will vary and generally will be maintained at an effective kill water rate to prevent backflow in the wellbore. The effective kill water rate will generally range from about 2 gallons/minute (0.45 m$^3$/hr) to about 25 gallons per minute (5.7 m$^3$/hr).

In order to obtain the benefits of the present invention, the foam must contain the scavenging agent in an amount effective to insure mitigation of the hazardous sulfur compounds over the time frame of interest at the conditions of interest is required. These concentrations may be readily ascertained by one skilled in the art via routine test procedures.

Foaming agent in an amount effective to obtain the desired foam quality is required. The concentration will be dependent on water salinity and hardness, foaming agent, and anticipated exposure conditions in the wellbore. Preferred foaming agent concentrations, based on active foaming agent concentration, are about 0.005 to about 4.0 vol-% based upon the weight of water, scavenging agent and foaming agent in the liquid phase. More preferred foaming agent concentrations are about 0.01 to about 3.0 vol-% based on the liquid phase. Still more preferred foaming agent concentrations are about 0.1 to about 0.3 vol-% also based on the liquid phase.

The stiff foaming surfactants of the present invention are sulfonates and comprise linear alpha olefin sulfonates, including long-chain alkene sulfonates, long-chain hydroxyalkane sulfonates or mixtures of alkene sulfonates and hydroxyalkane sulfonates. These alpha olefin sulfonate surfactants may be prepared in a known manner by the reaction of sulfur trioxide ($SO_3$) with long-chain olefins containing 8 to 25, preferably 12 to 21 carbon atoms and having the formula $RCH = CHR_1$ where R is a higher alkyl group of 6 to 23 carbons and $R_1$ is an alkyl group of 1 to 17 carbons or hydrogen to form a mixture of sultones and alkene sulfonic acids which is then treated to convert the sultones to sulfonates. Preferred alpha olefin sulfonates contain from 14 to 16 carbon atoms in the R alkyl group and are obtained by sulfonating an a-olefin.

The foam composition of the present invention was found to be stable and effective for treating wellbore at temperatures ranging from ambient to a temperature of about 350° C. More preferably, the effective wellbore temperature for use of the foam composition of the present invention is between about 15° C. and about 300° C., and most preferably, the effective wellbore temperature for use of the foam composition of the present invention is between about 15° C. and about 260° C.

Foam is generally prepared using surface facilities wherein the diluted foaming agent and the diluted scavenging agent are injected separately or injected together as a single dilute solution as a liquid into the wellbore. In a preferred method, the diluted foaming agent and the diluted scavenging agent are injected separately or injected together as a single dilute solution directly into the wellbore, without the additional step of aerating the liquid with an air stream or a gaseous stream of a gaseous portion of the vapor withdrawn from the wellbore. Preferably, the dilute liquid solutions of foaming surfactant and scavenging agent are combined in a turbulent manner, or combined with the kill water in a turbulent manner. Generally, this step is conducted by combining the liquid components under turbulent conditions at a "mixing T". Using the method of the present invention there is no requirement for complex means to generate the foam by separately flowing the liquid and a separate gas stream such as air or natural gas down the wellbore using separate confining means and to thereby combine the gas and liquid downhole either co-currently or counter-currently and thereby creating foam in the wellbore. The foam composition of the present is self-generating on being injected into the vapor space of the wellbore.

In the preferred method, the foam is injected into the tubular annual space of the wellbore and the foam is generated at the point of introduction of the foamed aqueous stream to the wellbore when the gas and liquid are intimately mixed, thereby forming foam. The foam is injected into either the tubular or annular space in the wellbore. If any wellbore fluid is released from the wellbore, it is produced via the non-injected tubular or annular space. Foam velocity is dependent upon the type of wellbore operation being performed and the designation of said operating conditions is readily within the capabilities of one possessing ordinary skill in the art.

Without being bound by any particular theory, it is believed that, a wellbore has a gas zone comprising hydrogen sulfide and other hazardous sulfur compounds above a reservoir zone comprising liquid hydrocarbons. It was discovered that by injecting the foam composition of the present invention at a point below the gas zone produced a foam barrier in the vapor space of the wellbore throughout and above the gas zone which served to create a suppression zone filled with the foam with the result that bubbles of the hazardous sulfur compounds were prevented from escaping from the wellbore. It was also found that when the foam composition of the present invention was introduced at a point above the gas zone, it was necessary to introduce a water stream such as kill water at an effective rate to prevent backflow through the wellbore. When there is a water phase in the wellbore, wherein the water phase is below the hydrocarbon phase or the gas zone, and the foam composition is introduced directly into the water phase, the foam composition is not effective in mitigating the hazardous sulfur compounds. Thus, in order to mitigate the hazardous sulfur compounds within a wellbore, the foam composition should be introduced at a point in the wellbore which is within or below the gas zone and above any water zone within the wellbore to achieve sufficient agitation of the foamed scavenging agent in the gas zone. It is believed that the scavenging agent reacts with the hazardous sulfur compounds to form reaction products which are non-volatile, sulfur-containing species which are not soluble in hydrocarbons. It is further believed that the reaction product is bound in the water phase. The net result is that evolution of the sulfur compounds from the crude oil or natural gas is prevented. The incorporation of the composition with the sour crude oil or sour natural gas does not have any deleterious effect on the oil or gas, and the composition appears to selectively react with the sulfur compounds.

In the process of the present invention, the foamed aqueous stream comprises from about 0.01 vol-% to about 1.0 vol-% active scavenging agent and from about 0.01 to about 3 vol-% stiff foaming agent. Preferably the foamed aqueous stream comprises an aqueous solution containing water and from about 0.01 vol-% to about 10 vol-% of a treating concentrate, wherein the treating concentrate comprises active scavenging agent and stiff foaming agent which are available as a dilute aqueous solution. Typically, the dilute scavenging agent comprises about a 30 to about a 60 volume percent solution of active scavenging agent, and the dilute stiff foaming agent comprises from about 20 to about 60 volume percent stiff foaming agent in water. Preferably, the treating concentrate comprises from about 5 to about 60 vol-% active scavenging agent, more preferably, the treating concentrate comprises from about 12 to about 60 vol-% active scavenging agent, and most preferably, the treating concentrate comprises from about 12 to about 24 active scavenging agent. Preferably, the treating concentrate comprises from about 5 to about 60 vol-% stiff foaming agent, more preferably, the treating concentrate comprises from about 8 to about 60 vol-% stiff foaming agent, and most preferably, the treating concentrate comprises from about 8 to about 24 stiff foaming agent. Because the scavenging agent and the stiff foaming agent are solids in pure form, they are commercially distributed as diluted materials in an aqueous solution. Typically, the diluted scavenging agent comprises about a 30 to about a 60 volume percent solution of active scavenging agent, and the diluted stiff foaming agent comprises from about 20 to about 60 volume percent stiff foaming agent in water. Preferably, the treating concentrate comprises from about 12 to about 60 volume percent of a diluted scavenging agent and from about 8 to about 60 volume percent of a diluted stiff foaming agent.

According to the invention, preferably, the foamed aqueous stream comprises a ratio of from about 10:1 to about 0.5:10 of active scavenging agent to stiff foaming surfactant. More preferably, the foamed aqueous stream comprises a ratio of from about 7.5:1 to about 1:1 of active scavenging agent to stiff foaming surfactant. Most preferably, the foamed aqueous stream comprises a ratio of from about 3:1 to about 1:1 of active scavenging agent to stiff foaming surfactant.

Using the process of the present invention it was possible to successfully mitigate the dangerous sulfur concentrations at the wellbore to a safe level and maintain the safe level during the period while the treatment solution of the present invention was continuously introduced into the wellbore.

The following examples are introduced to illustrate the process and the advantages of the present invention for the purposes of instruction and should not be considered as a limitation on the scope of the invention.

EXAMPLES

The following tests were carried out on commercial wellbores in California oil fields which were associated with hazardous sulfur compounds as characterized by the level of hydrogen sulfide gas at the wellbore. The level of hydrogen sulfide gas in the vapor space at the wellbore was determined by opening the wellbore and sampling the gas at the surface of the wellbore according to the well-known ASTM D4810-88 standard test method for hydrogen sulfide in natural gas using length of stain detector tubes. In the tests, various combinations a hydrogen sulfide scavenger (SCAV-TREAT™ 8112, available from Clariant Corporation, Charlotte, N.C.) as a 40 volume percent aqueous solution of triazine, and a stiff foaming surfactant (SURFTREAT™ 8534, available from Clariant Corporation, Charlotte, N.C.) comprising a 40 vol-% aqueous solution of linear alkyl olefin sulfonate. Concentrations levels of the hydrogen sulfide scavenger applied to the wellbore ranged from 100 volume percent of the aqueous solution to a 1 volume percent solution, with and with out either the stiff foaming surfactant and kill water. When the kill water was injected, the kill water was either injected at a low pressure of about 45 psia (about 4 atmospheres) and a low volume rate of about 50 gal/min (about 11 m$^3$/h) or at high pressure of about 115 psia (about 8 atmospheres) and a high volume rate of about 100 gal/min (22.7 m$^3$/h). All of the results are summarized in Table 1.

Example 1

A series of tests (Run 1–4) were performed on a wellbore A having an initial concentration of about 4000 ppm-vol hydrogen sulfide and a pressure at the wellbore ranging from about 65 to 115 psia (about 4 to about 8 atmospheres) at ambient temperature. Runs 1–4 employed a diluted scavenger solution, diluted to a 10 percent volume level in water. The results of the series of tests No. 1–4 are shown in Table 1. In Run 1, a 10 volume percent solution of the scavenger solution was prepared in a 600 gallon (2.3 m$^3$) tank and injected into the wellbore at an injection rate of about 60 gal/min (13.6 m$^3$/h) without kill water. In run 1, the final hydrogen sulfide concentration at the end of the run had only dropped to a level of 1,200 ppm-vol. In run 2, the conditions of Run 1 were repeated with the addition of the introduction of kill water at low volume and low pressure, resulting in the further reduction of the final hydrogen sulfide concentration to about 600 ppm-vol. In Run 3, the conditions of Run 1 were repeated, with the injection of the scavenger being injected at high pressure without kill water, resulting in the further reduction of the final hydrogen sulfide concentration to about 100 ppm-vol. In Run 4, the conditions of Run 1 were reproduced with the addition of kill water injection at high volume and high pressure, with the scavenger being injected at a rate of 60 gal/h (0.23 m$^3$/h), resulting in the still further reduction of the final hydrogen sulfide concentration at the surface of the wellbore to 20 ppm-vol, which was still unacceptable.

Example 2

In Example 2, a series of tests (Runs 5–7) on wellbore A employed the scavenger solution without dilution. In Runs 5, the scavenger solution was introduced at a low rate of about 30 quarts/day (about 0.03 m$^3$/h), and in Runs 6 and 7, the scavenger solution was introduced to the wellbore at a high rate of 60 quarts per day (about 0.06 m$^3$/h). Kill water was employed at high pressure and high volume in Runs 5–7. Although the final hydrogen sulfide concentrations ranged from 450 to 30 ppm-vol for Runs 5–7, respectively, the results were still unacceptable.

Example 3

In Example 3, Runs 8–10, the experiments on wellbore A were carried out using diluted solutions of the scavenger solution at the specific levels of 7.5, 5, and 3 volume percent, respectively. In Runs 8–10, kill water was injected at high pressure and volume, and all of the scavenger solutions were injected at a rate of about 60 gal/hr (about 0.23 m$^3$/hr). In Run 8, at the scavenger dilution level of 7.5 volume percent, the final hydrogen sulfide concentration was only reduced to about 30 ppm-volume, while in Runs 9 and 10, the final hydrogen sulfide concentration could only be reduced to about 200 ppm-volume. Thus, Runs 8–10 which were conventional in nature did not provide a method to successfully reduce the final hydrogen sulfide concentration to an acceptable safe level.

Example 4

In Run 11, the procedure of Run 8 on wellbore A was repeated using a scavenger solution diluted to a level of about 7.5 volume percent and with the addition of the separate injection a 2 volume percent aqueous solution containing a stiff foaming surfactant (SURFTREAT™ 8534, available from Clariant Corporation, Charlotte, N.C.). The surfactant solution was prepared in a separate 600 gallon tank and injected at the same rate as the diluted scavenger solution. The ratio of scavenger (S) to foaming surfactant (F) was 3.5 and the proportion of the injected treatment comprising the diluted scavenger and foaming agent was about 2 vol-percent of the kill water volume. Surprisingly, the final hydrogen sulfide concentration dropped immediately below the detectable limit, and the pressure at the wellbore dropped below atmospheric pressure.

Example 5

Example 5 represented a series of experiments on a wellbore B which had an initial hydrogen sulfide concentration of about 10,000 ppm-volume. In Run 12, wellbore B was treated with a dilute scavenger solutions of 10 volume percent at a low injection pressure, and in Run 13, wellbore B was treated with a 7.5 volume percent diluted scavenger solution at a high injection pressure. No foaming surfactant was employed. The resulting final hydrogen sulfide concentration at the wellbore for Runs 12 and 13 was 1,200 and 30 ppm-vol hydrogen sulfide, respectively.

Example 6

In Example 6, Runs 14–15 repeated the conditions of Run 13 using a 7.5 volume percent solution of the dilute scavenger solution and in addition employed a dilute solution of the stiff foaming surfactant at a 2 vol-% dilution in Run 14 and at a 1 vol-% dilution in Run 15. The final hydrogen sulfide concentration at the wellbore B was reduced below detectable levels. The ratio of scavenger (S) to foaming surfactant (F) in Runs 14 and 15 was 3.75 and 7.5, respectively. The proportion of the treatment solution comprising the scavenger and foaming surfactant to the kill water was about 1 volume percent of the kill water volume.

Example 7

In Example 7, Run 16 and 17 employed the procedure of Run 15 on wellbore B with a 1 volume percent dilute solution of the stiff foaming surfactant, wherein the scavenger solution was diluted to 5 volume percent and 3 volume percent, respectively. The final hydrogen sulfide concentration at the wellbore B in Runs 16 and 17 was reduced below detectable levels. The ratio of scavenger (S) to foaming surfactant (F) in Runs 16 and 17 was 5 and 3, respectively, and the proportion of the treatment solution comprising the scavenger and foaming surfactant to the kill water was about 1 volume percent of the kill water volume.

Example 8

In Example 8, the treatment method of the present invention was employed on a wellbore C as shown in Run 18 which had an initial hydrogen sulfide level of 4,000 ppm-vol hydrogen sulfide. Treatment with a 7.5 volume percent scavenger solution and a 2 volume percent solution of the stiff foaming surfactant with kill water at high pressure and volume reduced the hydrogen sulfide below detectable levels. The ratio of scavenger (S) to foaming surfactant (F) in Run 18 was 3.75. The proportion of the treatment solution comprising the scavenger and foaming surfactant to the kill water was about 1 volume percent of the kill water volume.

Example 9

In Example 9, the treatment method of the present invention was employed on a wellbore D as shown in Run 19 which had an initial hydrogen sulfide level of 6,200 ppm-vol hydrogen sulfide. Treatment with a 1 volume percent scavenger solution and a 1 volume percent solution of the stiff foaming surfactant having a ratio of scavenger to stiff foaming agent of about 1.0 and with kill water at high pressure and volume, corresponding to a 1 volume percent treatment solution to kill water, based on the kill water. The results of Run 19 reduced the hydrogen sulfide concentration at the wellbore to below detectable levels.

Example 10

In Example 10, the treatment method of the present invention was employed on a wellbore E which as shown in Runs 20 and 21 which had an initial hydrogen sulfide level of 80 ppm-vol hydrogen sulfide. Treatment with a 1 volume percent scavenger solution and a 1 volume percent solution of the stiff foaming surfactant with kill water injected at high pressure and high volume, reduced the hydrogen sulfide below detectable levels.

Example 11

In Example 11, the treatment method of the present invention was employed on a wellbore F which had a wellbore pressure of nearly atmospheric pressure at the surface, and as shown in Runs 22 and 23 had an initial hydrogen sulfide level of 300 ppm-vol hydrogen sulfide. In Run 22, about 5 gallons of the undiluted scavenger solution was poured into the wellbore without kill water injection. The resulting final hydrogen sulfide concentration was 30 ppm-vol, which was not acceptable. In Run 23, treatment with a 1 volume percent scavenger solution and a 1 volume percent solution of the stiff foaming surfactant with kill water injected at high pressure and high volume, reduced the hydrogen sulfide below detectable levels.

TABLE 1

RESULTS OF OIL FIELD TESTING

| No. | WELL | Initial $H_2S$ Level, ppm-vol | Final $H_2S$ Level, ppm-vol | Scavenger Conc, Vol-% | Scavenger Rate, gal/hr | Kill Water Used: | Injection Pressure: | Foam Agent Conc: Vol-% |
|---|---|---|---|---|---|---|---|---|
| 1 | A | 4,000 | 1,200 | 10 | 60 | No | Low | 0 |
| 2 | A | 4,000 | 600 | 10 | 60 | Yes | Low | 0 |
| 3 | A | 4,000 | 100 | 10 | 60 | No | High | 0 |
| 4 | A | 4,000 | 20 | 10 | 60 | Yes | High | 0 |
| 5 | A | 4,000 | 450 | 100 | 30* | Yes | High | 0 |
| 6 | A | 4,000 | 250 | 100 | 60* | Yes | High | 0 |
| 7 | A | 4,000 | 30 | 100 | 60* | Yes | High | 0 |
| 8 | A | 4,000 | 30 | 7.5 | 60 | Yes | High | 0 |
| 9 | A | 4,000 | 200 | 5 | 60 | Yes | High | 0 |
| 10 | A | 4,000 | 200 | 3 | 60 | Yes | High | 0 |
| 11 | A | 4,000 | ND | 7.5 | 60 | Yes | High | 2 |
| 12 | B | 10,000 | 1,200 | 10 | 60 | Yes | Low | 0 |
| 13 | B | 10,000 | 30 | 7.5 | 60 | Yes | High | 0 |
| 14 | B | 10,000 | ND | 7.5 | 60 | Yes | High | 2 |
| 15 | B | 10,000 | ND | 7.5 | 60 | Yes | High | 1 |
| 16 | B | 10,000 | ND | 5 | 60 | Yes | High | 1 |
| 17 | B | 10,000 | ND | 3 | 60 | Yes | High | 1 |
| 18 | C | 4,000 | ND | 7.5 | 60 | Yes | High | 2 |
| 19 | D | 6,200 | ND | 1 | 60 | Yes | High | 1 |
| 20 | E | 80 | ND | 1 | 60 | Yes | High | 1 |
| 21 | E | 80 | ND | 1 | 60 | Yes | High | 1 |
| 22 | F | 300 | 30 | 100 | 5** | No | Low | 0 |
| 23 | F | 300 | ND | 1 | 60 | Yes | High | 1 |

*qt/d; **gallons; ND—None Detectable

We claim:

1. A process for intermittently mitigating hazardous sulfur compounds in a wellbore defining a vapor space between a surface end and a hydrocarbon fluid with said wellbore, said process comprising injecting an effective amount of a foamed aqueous stream comprising an active scavenging agent and a still foaming surfactant into the vapor space for an effective period of time to reduce pressure at the wellbore and to significantly reduce hazardous sulfur compounds in the vapor space without withdrawing hydrocarbon fluid or hazardous sulfur compounds.

2. A process for intermittently mitigating hazardous sulfur compounds in a wellbore defining a vapor space between a surface end and a hydrocarbon fluid within said wellbore, said process comprising injecting an effective amount of a foamed aqueous stream comprising an active scavenging agent and a stiff foaming surfactant into the vapor space for an effective period of time to reduce pressure at the wellbore and to significantly reduce hazardous sulfur compounds in the vapor space without withdrawing hydrocarbon fluid or hazardous sulfur compounds, wherein the hazardous sulfur compounds include hydrogen sulfide.

3. The process of claim 2 wherein the active scavenging agent is selected from the group consisting of triazine, formaldehyde, glutaraldehyde, glyoxal, and mixtures thereof.

4. The process of claim 2 wherein the stiff foaming surfactant comprises a sulfonate.

5. The process of claim 2 wherein the stiff foaming surfactant comprises a linear alkyl olefin sulfonate.

6. The process of claim 2 wherein the foamed aqueous stream comprises a ratio of from about 10:1 to about 0.5:10 active scavenging agent to stiff foaming surfactant.

7. The process of claim 2, further comprising injecting a kill water stream into the wellbore at an effective kill water rate.

8. The process of claim 7, wherein the effective kill water rate comprises between about 0.4 and about 6.0 m$^3$/hr.

9. The process of claim 2 wherein the foamed aqueous stearate comprises a ratio of from about 7.5:1 to about 1:1 active scavenging agent to stiff foaming surfactant.

10. The process of claim 2 wherein the foamed aqueous stream comprises from about 0.01 vol-% to about 1.0 vol-% active scavenging agent.

11. The process of claim 2 wherein the foamed aqueous stream comprises from about 0.01 vol-% to about 3 vol-% stiff foaming surfactant.

12. The process of claim 2 wherein the effective period of time is sufficient to mitigate the hazardous sulfur compounds at the wellbore for a working period of from about 0.01 hour to about 1000 hours.

13. The process of claim 2 wherein the hazardous sulfur compounds at a wellbore are selected from the group consisting of hydrogen sulfide, mercaptans, sulfur oxides, and mixtures thereof.

14. The process of claim 2 wherein the foamed aqueous stream is injected into the wellbore at a rate of from about 0.6 m$^3$/hr (0.25 gal/min) to about 2.3 m$^3$/hr (10 gal/min).

15. The process of claim 2 wherein the foamed aqueous stream comprises an aqueous solution containing water and from about 0.01 vol-% to about 10 vol-% of a treating concentrate comprising from about 5 to about 80 vol-% active scavenging agent and from 5 vol-% to about 60 vol-% stiff foaming agent, wherein a ratio of active scavenging agent to the stiff foaming agent ranges between about 1:10 and about 10:1 on a volume basis.

16. The process of claim 2 wherein the foamed aqueous stream comprises an aqueous solution containing water and from about 0.01 vol-% to about 10 vol-% of a treating concentrate comprising from about 12 to about 24 vol-% active scavenging agent and from 8 vol-% to about 24 vol-% stiff foaming agent, wherein a ratio of active scavenging agent to the stiff foaming agent ranges between about 1:10 and about 7.5:1 on a volume basis.

17. The process of claim 16, wherein the ratio of active scavenging agent to stiff foaming agent comprises about 7.6:1 to about 1:1 on a volume basis.

18. The process of claim 2 wherein the vapor space comprises a gas zone comprising said hazardous sulfur compounds and a hydrocarbon fluid zone below said gas zone and said injecting of the foamed aqueous stream occurs in or above the hydrocarbon fluid zone.

* * * * *